(12) United States Patent
Cho et al.

(10) Patent No.: US 9,705,114 B2
(45) Date of Patent: Jul. 11, 2017

(54) SECONDARY BATTERY

(71) Applicant: Samsung SDI Co., Ltd., Yongin-si, Gyeonggi-do (KR)

(72) Inventors: Mansik Cho, Yongin-si (KR); Sunhye Hu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/863,360

(22) Filed: Sep. 23, 2015

(65) Prior Publication Data
US 2016/0226035 A1   Aug. 4, 2016

(30) Foreign Application Priority Data
Jan. 30, 2015   (KR) .................. 10-2015-0015595

(51) Int. Cl.
*H01M 2/10*   (2006.01)

(52) U.S. Cl.
CPC ......... *H01M 2/1016* (2013.01); *H01M 2/105* (2013.01)

(58) Field of Classification Search
CPC ............................ H01M 2/1016; H01M 2/105
See application file for complete search history.

(56) References Cited

U.S. PATENT DOCUMENTS

| 6,174,618 | B1 * | 1/2001 | Nishiyama | ............ | H01M 2/105 |
| | | | | | 429/100 |
| 6,530,804 | B1 * | 3/2003 | Wu | ..................... | H01M 2/1055 |
| | | | | | 439/500 |

FOREIGN PATENT DOCUMENTS

JP            10064495 A   *   3/1998

\* cited by examiner

*Primary Examiner* — Jane Rhee
(74) *Attorney, Agent, or Firm* — Lewis Roca Rothgerber Christie LLP

(57) ABSTRACT

A secondary battery includes a battery cell and a cell holder having an opening with a width varying along a first direction which extends along a lengthwise axis of the battery cell in the cell holder.

15 Claims, 7 Drawing Sheets

SECONDARY BATTERY

CROSS-REFERENCE TO RELATED APPLICATION

This application claims priority to and the benefit of Korean Patent Application No. 10-2015-0015595, filed on Jan. 30, 2015, in the Korean Intellectual Property Office, the disclosure of which is incorporated herein in its entirety by reference.

BACKGROUND

1. Field

The present invention relates to a secondary battery.

2. Description of the Related Art

Generally, a secondary battery is rechargeable, while a primary battery is unable to be recharged. The secondary battery is usable as an energy source in, for example, a mobile device, an electric vehicle, a hybrid vehicle, an electric bicycle, an uninterruptible power supply apparatus, and so on. A secondary battery can be used as a single battery or a battery pack having a plurality of batteries electrically connected as a one unit depending on an external apparatus usable with the secondary battery.

SUMMARY

One or more exemplary embodiments include a secondary battery having a structure to improve production yield and reduce defect.

One or more exemplary embodiments include a secondary battery to promote a thermal dissipation of an electric battery cell and restrict a movement of the electric battery cell.

Additional aspects will be set forth in part in the description which follows and, in part, will be apparent from the description of the presented embodiments.

According to one or more embodiments, a battery cooling system includes at least one electrical battery cell and a cell holder having an opening with a width variable in a direction in which the electrical battery cell is inserted.

According to one or more embodiments, the opening may have a maximum width at ends of the cell holder and a minimum width at a center portion of the cell holder with respect to the insertion direction.

According to one or more embodiments, the width of the opening may be changed continuously in the front and rear direction.

According to one or more embodiments, the cell holder may include a sidewall to define the opening, and the sidewall has an inclination angle in a direction slanted with respect to a center axis of the opening.

According to one or more embodiments, the inclination angle may be gradually increased according to a distance from a center portion to an end portion of the side wall along the front and rear direction.

According to one or more embodiments, the cell holder may include a first section located at a center portion of the cell holder and having a first inclination angle with respect to the center axis, a second section disposed adjacent to the first section and having a second inclination angle greater than the first inclination angle, and a third section disposed adjacent to the second section and at end portions of the cell holder and having a third inclination angle greater than the second inclination angle.

According to one or more embodiments, the first section may include a bottle neck at the center portion of the cell holder with respect to the front and rear direction, and the first inclination angle may be formed symmetrically at either side of the bottle neck.

According to one or more embodiments, the first section may have a longest length among lengths of the first, second, and third sections.

According to one or more embodiments, the second section may include a pair of sections formed at either side of the first section.

According to one or more embodiments, the third section may include a pair of sections formed at either side of the cell holder.

According to one or more embodiments, the cell holder may be formed with a composite material including a matrix resin with a glass fiber.

According to one or more embodiments, the battery cell may include a plurality of battery cells arranged in a first row and a second row in the front and rear direction, and the cell holder may include a first cell holder into which the battery cells of the first row are inserted, and a second cell holder into which the battery cells of the second row are inserted.

According to one or more embodiments, the first cell holder and the second cell holder may be disposed to form a curve shape such that the battery cells of the first and second rows are arranged on a round arc.

According to one or more embodiments, the first cell holder and the second cell holder may have a same curve shape.

According to one or more embodiments, the first cell holder and the second cell holder may be arranged such that the battery cells of the first row and the second row are not disposed along a straight line.

BRIEF DESCRIPTION OF THE DRAWINGS

These and/or other aspects will become apparent and more readily appreciated from the following description of the embodiments, taken in conjunction will the accompanying drawings in which.

DETAILED DESCRIPTION

Figure 1:
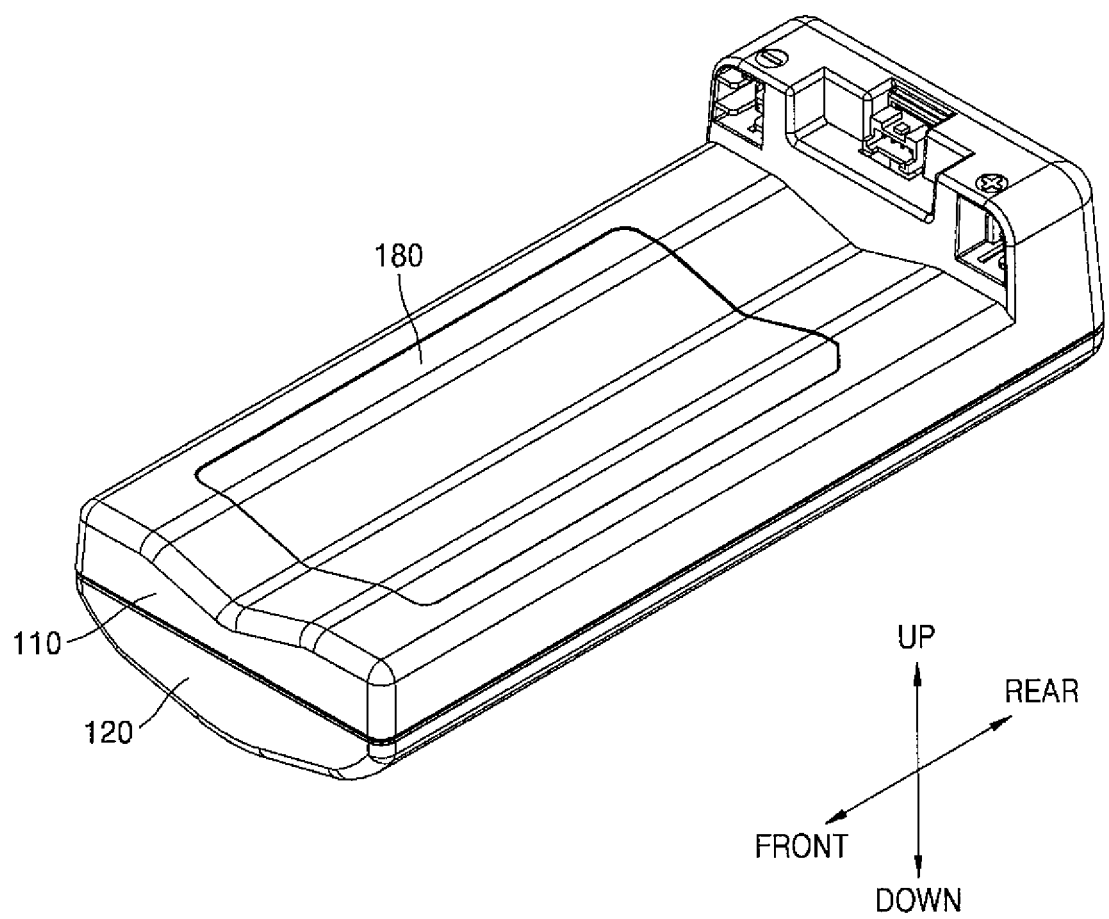
FIG. 1 is a perspective view illustrating a secondary battery according to an embodiment of the present general inventive concept.

Reference will now be made in detail to embodiments, examples of which are illustrated in the accompanying drawings, wherein like reference numbers refer to like elements throughout. In this regard, the present embodiments may have different forms and should not be construed as being limited to the descriptions set forth herein. Accordingly, the exemplary embodiments are merely described below, by referring to the figures, to explain aspects of the present invention. As used herein, the term "and/or" includes any and all combination s of one or more the associated listed items. Expressions such as "at least one of," when preceding a list of elements, modify the entire list of elements and do not modify the individual elements of the list.

In the exemplary embodiments, the terms, such as first, second, etc., should not be limited by their terms, but are used to distinguish one element from other element in the exemplary elements.

In the exemplary embodiments, the singular terms are intended to include the plural terms as well, unless the context clearly indicates otherwise.

In the exemplary embodiments, the terms of "comprise" or "include" when used in this specification, specify the presence of stated features and characteristics, but not preclude the presence or addition of one or more features and characteristics.

In the exemplary embodiments, when a portion, such as a layer, area, or element, is referred to as being "on" another portion, it can be directly on the other portion or intervening layer, area or elements may be present.

In the drawings, the size and relative sizes of the elements can be reduced or exaggerated for clarity and for the purpose or description. For example, since the size or thickness of each element is illustrated in the drawings for the purpose of description, the present invention is not limited to the drawings illustrating the exemplary embodiments.

Hereinafter, a secondary battery according to an embodiment of the present general inventive concept will be explained with reference to drawings.

Figure 2:
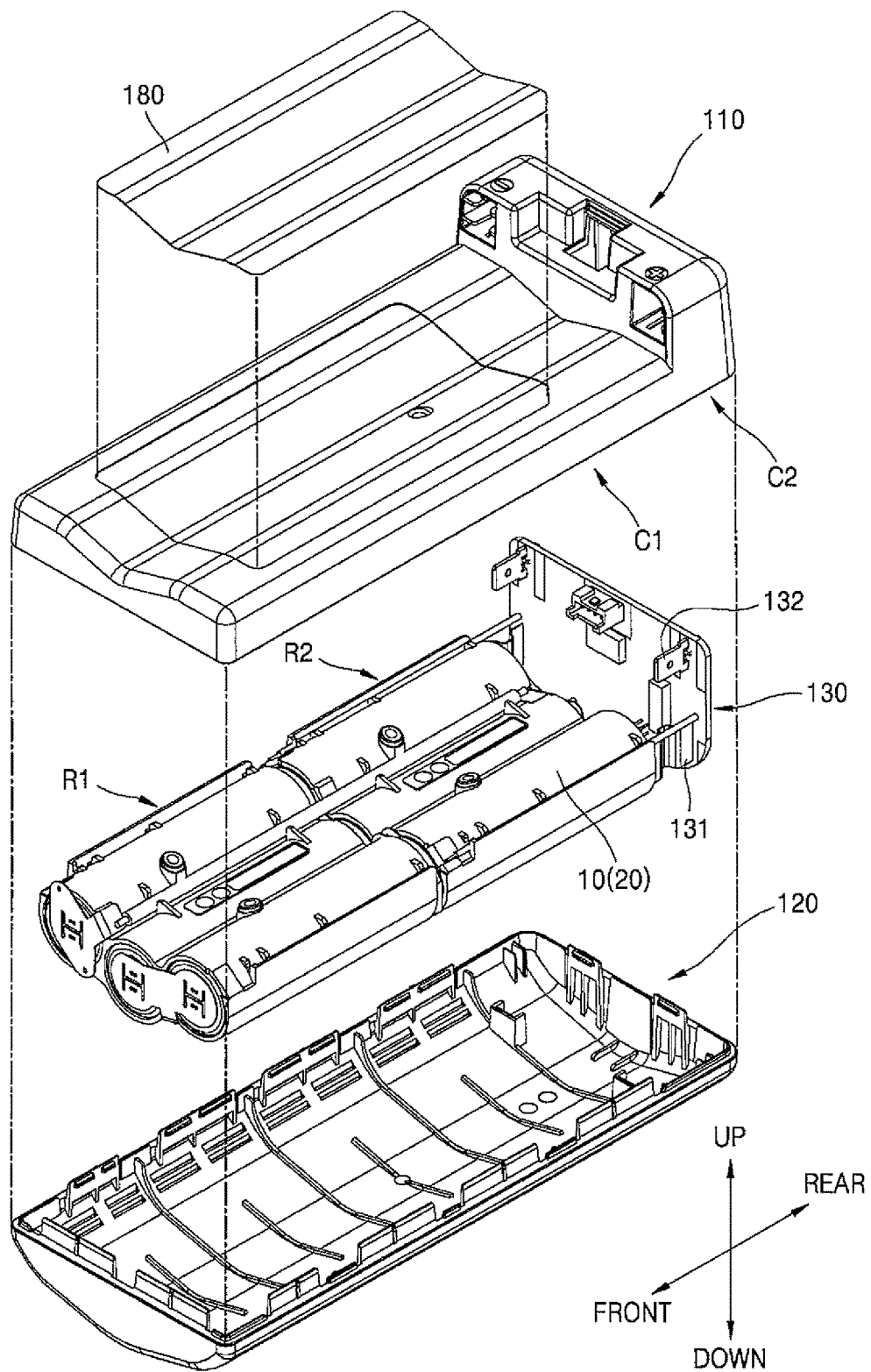
FIG. 2 is an exploded perspective view illustrating the secondary battery of FIG. 1.
Figure 3:
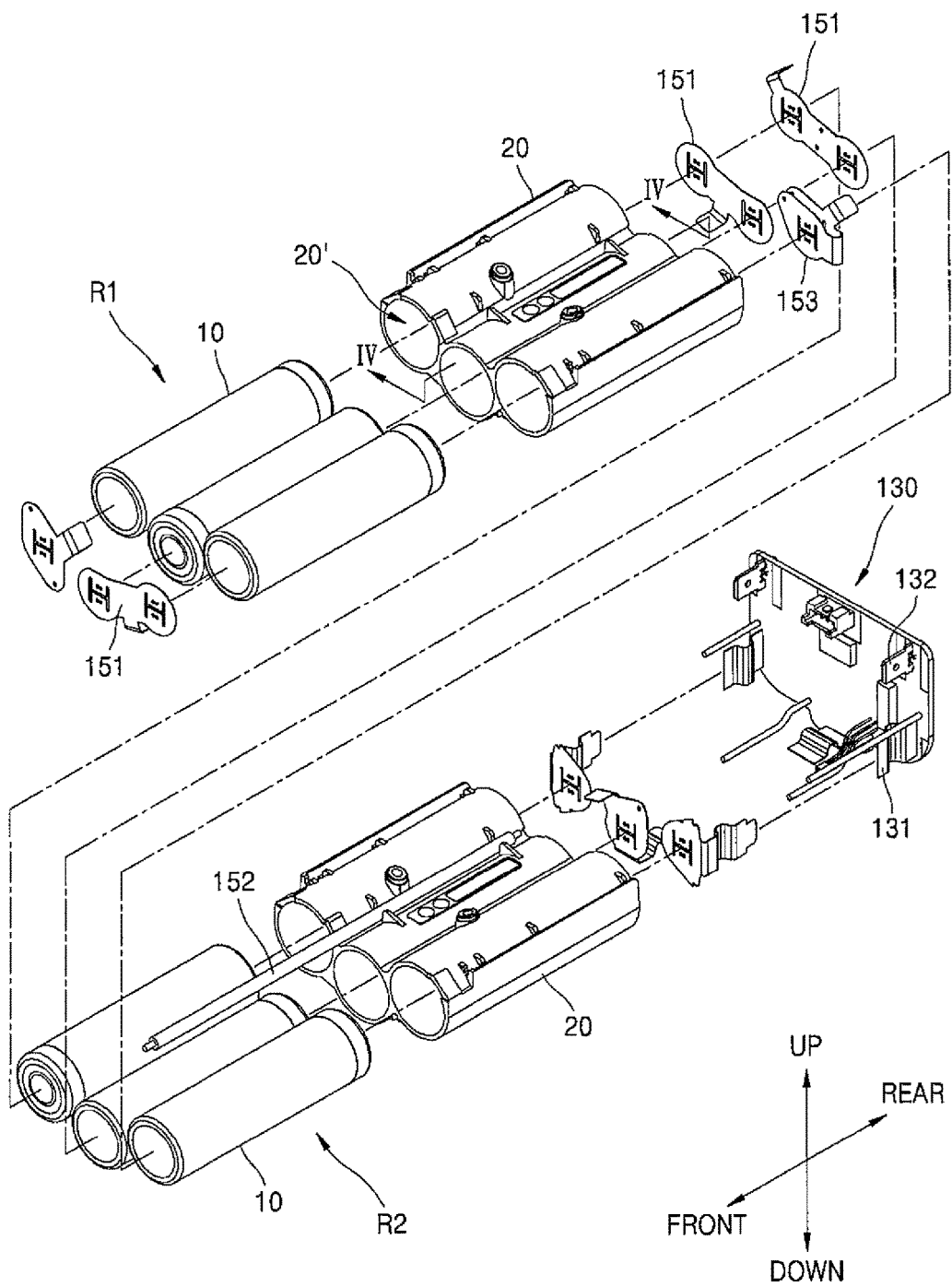
FIG. 3 is an exploded perspective view illustrating an electrical connection state of the secondary battery of FIG. 2.

FIG. 1 is a perspective view of a secondary battery according to an embodiment of the present general inventive concept, FIG. 2 is an exploded perspective view of the secondary battery of FIG. 1, and FIG. 3 is an exploded perspective view showing an electrical connection state of the secondary battery of FIG. 2.

Referring to the figures, the secondary battery includes at least two battery cells 10, a protection circuit module 130 located at a rear portion of the battery cells 10 to control a charging or discharging operation of the battery cells 10, a connection tap 131 configured to electrically connect the battery cells 10 and the protection circuit module 130, an external terminal 132 configured to electrically connect the protection circuit module 130 and an external apparatus. For example, the connection tap 131 forms a passage of a charging or discharging current between the battery cells 10 and the protection circuit module 130, and the external terminal 132 forms a passage of a charging or discharging current between the protection circuit module 130 and the external apparatus. The connection tap 131 and the external terminal 132 are oriented parallel in a front and rear direction and also located at different levels in an up and down direction.

The at least two battery cells 10 are electrically connected to provide a required electrical output. For example, the battery cells 10 may be in a parallel connection, in a series connection, or in a combination of the parallel and serial connections. For example, according to an embodiment of the present invention, the secondary battery may include six battery cells 10, and the six battery cells 10 may be connected in series to provide a required high voltage as an electrical power output.

For example, the battery cells 10 may be arranged in two rows along the front and rear direction. The battery cells 10 may include a first row R1 of battery cells located in a front portion of the front and rear direction and a second row R2 of battery cells located in a rear portion of the front and rear direction. Herein, the front and rear direction is referred to with respect to the lengthwise direction (i.e., along a lengthwise axis) in which the battery cells 10 and the protection circuit module 130 are oriented. As will be described later, a charging or discharging operation can be performed in the battery cells 10 according to a control of the protection circuit module 130 located in the rear portion of the front and rear direction.

The battery cells 10 and the protection circuit module 130 may be accommodated in an internal space between the first and second cases 110 and 120 which are configured to face each other and be coupled in the up and down (i.e., vertical) direction. An insulation plate 180 may be located on an upper side of the first case 110 located in an upper portion of the up and down direction. In one embodiment, the insulation plate 180 may have a contact surface configured to contact a user apparatus which has the battery cells 10 as a power source, and may also electrical insulate and protect the assembly from the user apparatus.

As illustrated in FIG. 3, the battery cells 10 may be electrically connected through the first, second, and third connection members 151, 152, and 153. Among the first, second, and third connection members 151, 152, and 153, the first connection member 151 and the second connection member 152 may have different shapes. For example, the first connection member 151 may electrically connect the battery cells 10 located in the same first row R1 or connect the battery cells 10 located in the same second row R2. The first connection member 151 may include a conductive member with a plate shape extended along a flat plane at a certain position of the front and rear direction. The first connection member 151 may be located at at least two positions, for example, three positions.

The second connection member 152 may electrically connect the battery cell 10 located in the first row R1 and the battery cell 10 located in the second row R2. The second connection member 152 may connect electrodes of the battery cells 10 located in different first and second rows R1 and R2 and spaced from each other. For example, the battery cells 10 located in the respective first and second rows R1 and R2 to be electrically connected may include a first pair of electrodes located close to each other and a second pair of electrodes located farther away from each other compared to the first pair of electrodes. In this case, the second connection member 152 may electrically connect the second pair of electrodes located farther away from each other. The second connection member 152 may include a conductive member with a wire shape extended along the front and rear direction. As will be described later, the first pair of electrodes of the battery cells 10 of different first and second rows R1 and R2 which are located close to each other may be connected to each other by the third connection member 153.

In the first, second, and third connection members 151, 152, and 153, shapes of the first connection member 151 and the second connection member 152 may be formed different according to consideration on a connection length between the battery cells 10 and the protection circuit module 130. In other words, the connection length may be shortened by disposing the battery cells 10 to be connected to the protection circuit module 130 at a rear position where the battery cells 10 are disposed to face the protection circuit module 130. Accordingly, in order to dispose the battery cells 10 of both ends with the highest and lowest potentials among the electrically connected battery cells 10 at the same rear portion, it may be necessary to have not only the first connection member 151 but also the second connection member 152 which connects the battery cells 10 located in the different first and second rows R1 and R2.

According to an embodiment of the present inventive concept, the secondary battery may further include the third connection member 153 to connect a pair of electrodes located closer to each other of the battery cells 10 located at the different rows, such as the first row R1 and the second row R2. For example, the third connection member 153 may be selectively provided according to a design or user preference. When the battery cells 10 located at the different first and second rows R1 and R2 directly contact each other, the third connection member may be omitted.

The protection circuit module 130 controls the charging and discharging operations of the battery cells 10. The protection circuit module 130 collects information on a voltage, a current, a temperature of the battery cells 10, and controls the charging and discharging operation of the battery cells 10 according to the information. For example, the protection circuit module 130 may detect an abnormal state, such as overcharge and overdischarge, and perform a safety operation in response to the abnormal state.

The battery cells 10 may be arranged in a curved line. For example, the battery cells 10 may not be arranged on a straight line along the left and right direction but arranged in a round arc shape. In other words, the battery cells 10 are arranged in a curved shape. The arrangement of the battery cells 10 in the curved shape may result in an ergonomic round shape and also provide an elegant design.

The battery cells 10 of the first row R1 are arranged in a curved shape, and the battery cells 10 of the second row R2 are also arranged in a curved shape. The first row R1 and the second row R2 may be arranged substantially a same curved shape.

The battery cells 10 arranged in the curved shape may provide a matching with a user apparatus. For example, the secondary battery may be attached to a user apparatus such as a cleaning apparatus to provide a driving power source thereto. Therefore, when the secondary battery has the curved shape, the secondary battery may adhere closely to a round shape portion around a motor of the cleaning apparatus so that an entire apparatus including the user apparatus and the secondary battery can be compact in dimension and the secondary battery can be stably supported according to the adhesion and matching with the user apparatus.

According to an embodiment of FIG. 3, the battery cells 10 within the first row R1 are arranged as a curved shape, and the battery cells 10 within the second row R2 are arranged as a curved shape. The battery cells 10 within the first row R1 may not be located in a straight line, and the battery cells 10 within the second row R2 may not be located in a straight line. For example, depending on the number of battery cells 10, the battery cells 10 arranged in a curved shape may include at least two battery cells 10 located adjacent to each other and arranged at a same level in the up and down direction.

As illustrated in FIG. 3, the battery cells 10 are electrically coupled to each other using the first, second, and third connection members 151, 152, and 153, and also structurally coupled to each other using the cell holder 20 in which the battery cells 10 are inserted. For example, the cell holder 20 is formed to arrange the battery cells 10 of the first row R1 in a curved shape and to arrange the battery cells 10 of the second row R2 in the curved shape. In other words, the cell holder 20 may include a first cell holder in which the battery cells 10 of the first row R1 are inserted and a second cell holder in which the battery cells 10 of the second row R2 are inserted.

The cell holder 20 structurally binds the battery cells 10 therein, defines assembling positions of the respective battery cells 10, and promotes thermal dissipation of the battery cells 10. For example, the cell holder 20 may comprise a material with high electrical insulation and a high thermal conductivity. The cell holder 20 may be a composite material with a matrix resin including the carbon or glass fiber with a high thermal conductibility. According to an embodiment of the present general inventive concept, the cell holder 20 may be a composite material including nylon as a matrix resin having a glass fiber.

The cell holder 20 includes an opening 20' formed to surround an outside surface of the corresponding battery cell 10, makes thermal contact with the battery cell being inserted through the opening 20' of the cell holder 20, and promotes the discharging of heat transferred from the battery cell 10. For example, when the heat is accumulated in a certain battery cell 10 according to a manufacturing process variation, the cell holder 20 prevents the heat accumulation and promotes the dissipation of the transferred heat.

Figure 4:
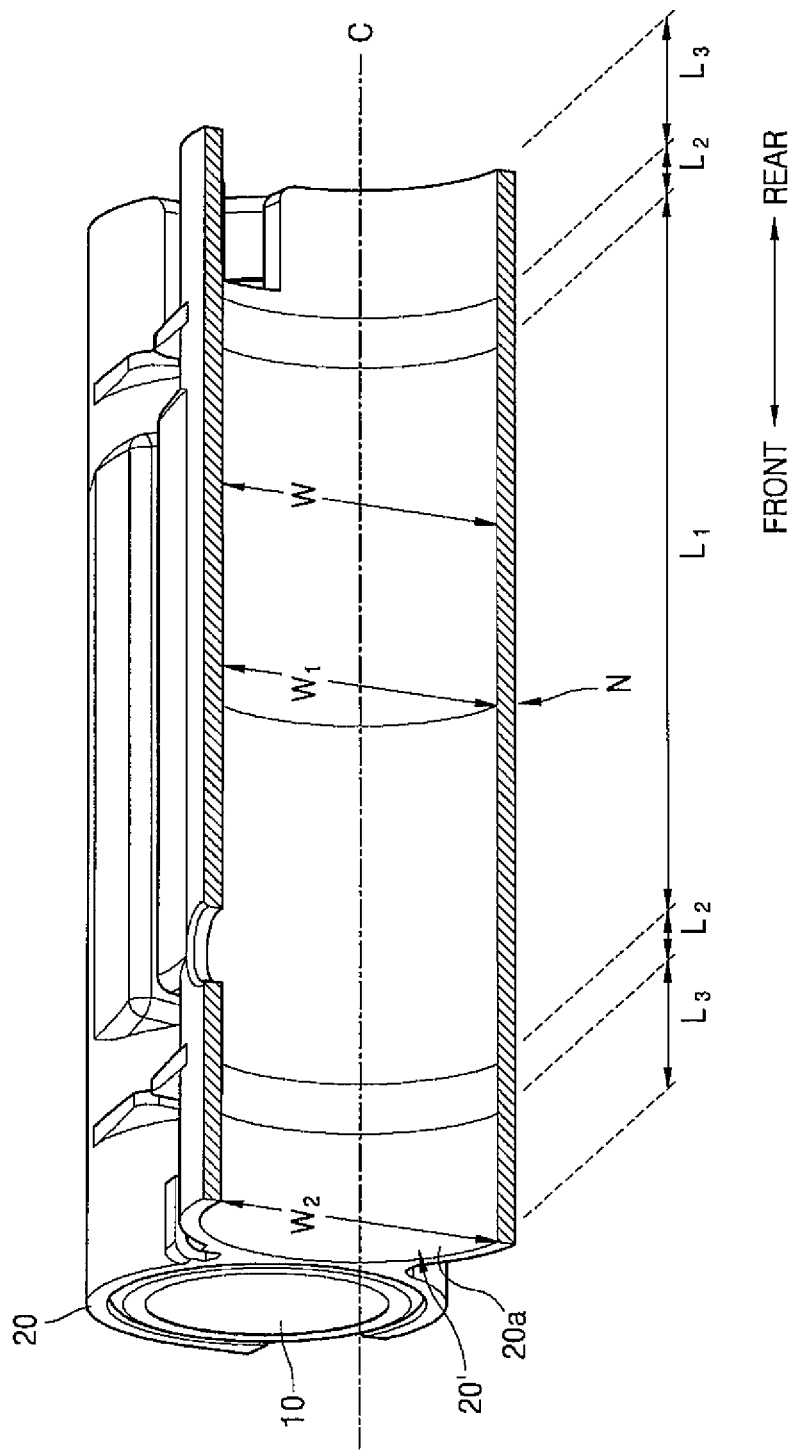
FIG. 4 is a cross-sectional view illustrating a cell holder taken along a line IV-IV of FIG. 3.
Figure 5A:
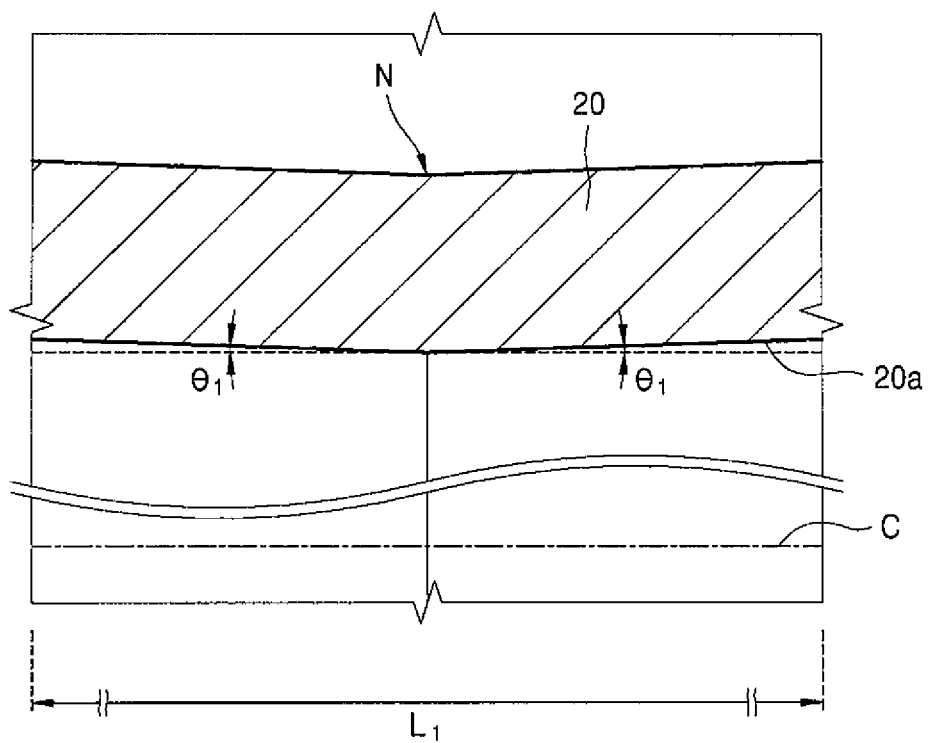
FIGS. 5A, 5B, and 5C are views illustrating inclination angles of respective sections of a cell holder of FIG. 4.
Figure 5B:
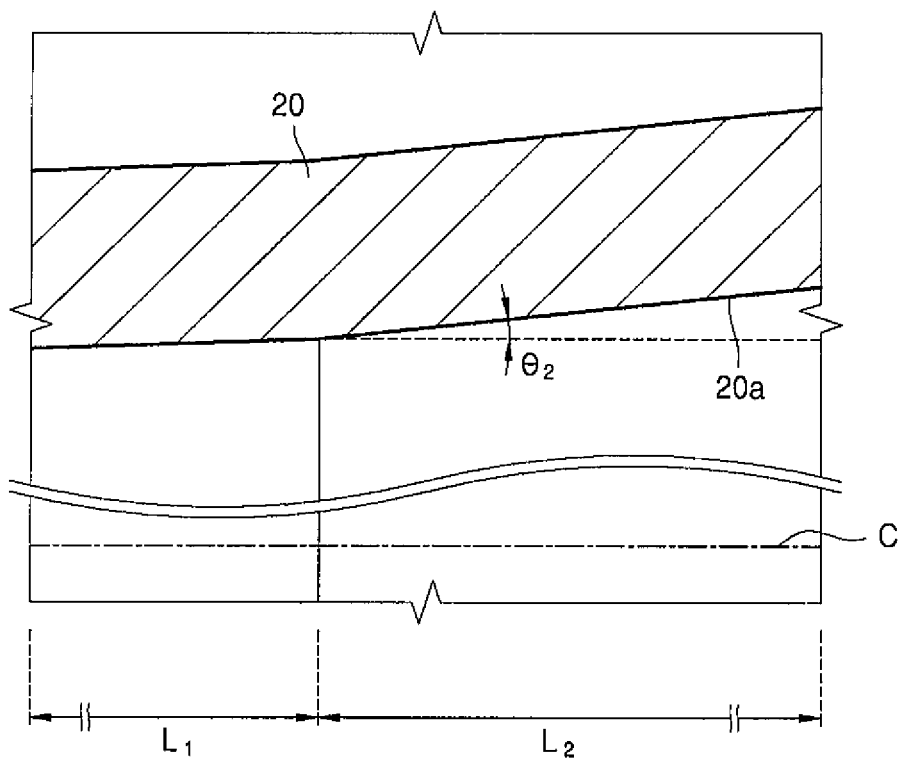
Figure 5C:
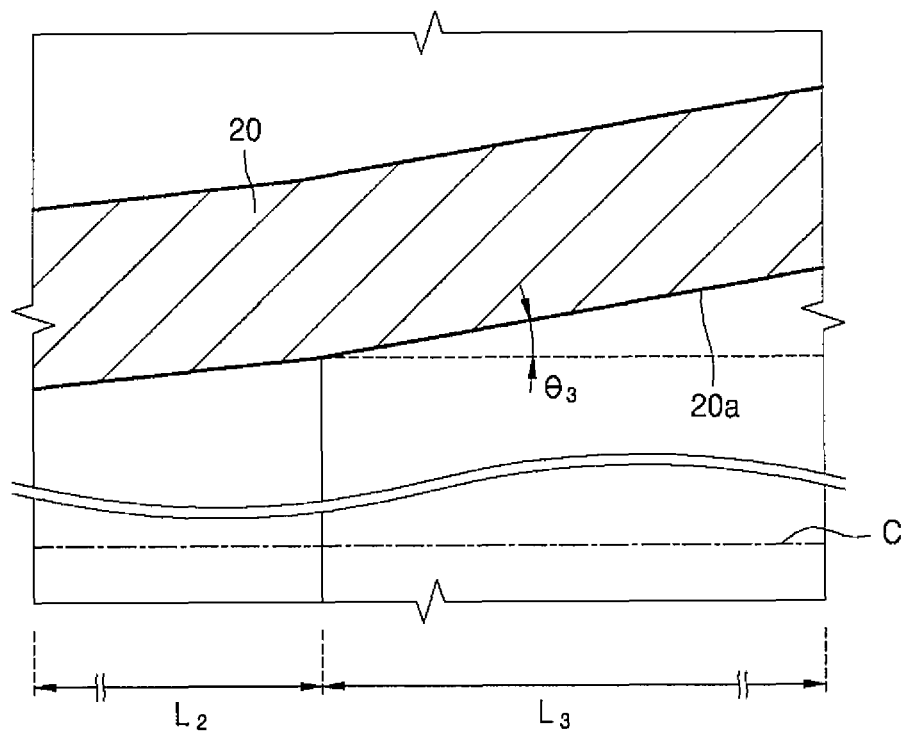

FIG. 4 is a cross-sectional view along a line IV-IV of FIG. 3, and FIGS. 5A, 5B, and 5C are views illustrating inclination angles $\theta_1$, $\theta_2$, and $\theta_3$ (or θ1, θ2, and θ3) of respective sections $L_1$, $L_2$, and $L_3$ (or L1, L2, and L3) of the cell holder 20 of FIG. 4.

Referring to FIG. 4, the cell holder 20 includes a structure of a hollow tube shape with the opening 20' along the front and rear direction in which each battery cell 10 is inserted. According to an embodiment of the present general inventive concept, the opening 20' has a width variable along the front and rear direction. Here, the front and rear direction refer to a lengthwise direction in which the battery cell 10 is inserted (i.e., along a lengthwise axis) or a lengthwise direction of the cell holder 20 inserted with the battery cells 10. For example, the opening 20' include a minimum width W1 at a middle portion and a maximum width W2 at end portions along the front and rear direction.

The opening 20' is designed to have a variable width along the front and rear direction by considering a manufacturing process of the cell holder 20. In other words, the cell holder 20 is formed according to an injection molding, or according to a process of injecting a plastic resin into a mold frame installed with a core and then pulling out the core from the injected plastic resin and/or the mold frame to form a hollow shape in the cell holder 20. In one embodiment, during a process of pulling out the core, it is helpful to avoid deformation of the shape of the cell holder 20 and any physical interference with other structure, and thus it is desirable to have a variable width in the opening 20' of the cell holder 20 along the front and rear direction. In other words, the opening 20' of the cell holder 20 has a width W increasing with respect to a distance from a middle portion of the opening 20' to an end portion of the opening 20' along the front and rear direction. This shape and variable width of the opening 20 may provide a geometric tolerance to increase along a direction in which the core is separated, for example, in the front and rear direction. The opening 20' of the cell holder 20 may have a width W to be changed linearly (continuously) in the front and rear direction or a width W to be changed non-linearly (e.g., step by step) in the front and rear direction.

As described hereinafter, a sidewall 20a of the cell holder 20 defines the opening 20' and has inclination angles θ1, θ2, and θ3 in a diagonal direction with respect to a center axis C of the opening 20', and thus the opening 20' of the cell holder 20 may have a continuously variable width W along the front and rear direction. According to an embodiment of the present general inventive concept, it is possible that the sidewall 20a of the cell holder 20 is extended along the center axis C of the opening 20' to have a multilevel shape with a width W increasing step by step with respect to the center axis C of the opening 20'.

The opening 20' of the cell holder 20 may have a minimum width W1 at a middle portion in the front and rear direction and a maximum width W2 at both end portions. The sidewall 20a of the cell holder 20 defining the opening 20' is extended obliquely in the diagonal direction. Here, the sidewall 20a of the cell holder 20 means an internal wall surface of the cell holder 20 to correspond to the opening 20'.

The sidewall 20a of the cell holder 20 has the inclination angles θ1, θ2, and θ3 inclined in the diagonal direction with respect to the center axis C of the opening 20'. According to an embodiment of the present general inventive concept, the inclination angles θ1, θ2, and θ3 are increased from the center portion to the end portions along the front and rear direction. For example, the cell holder 20 may include the first, second, and third sections L1, L2, and L3 with the different inclination angles θ1, θ2, and θ3, respectively. For example, the first, second, and third sections L1, L2, and L3 may have different lengths, and the first section $L_1$ may be set to have a maximum length.

The first section L1 may correspond to a middle portion of the cell holder 20 in the front and rear direction. The first section L1 may form a bottle neck in the middle portion of the cell holder 20 and may have symmetric shapes located in the front direction and the rear direction with respect to the bottle neck N. The symmetric shapes have the first inclination angle θ1 in the diagonal direction from the center axis C of the opening 20'. The first section L1 forms the bottle neck N to be located closer to the battery cell 10 than the second and third sections L2 and L3. The first section L1 may have the first inclination angle θ1 as a minimum angle throughout the length of the cell holder 20. The first section L1 may be located closest to the battery cell 10 at the bottle neck N, and also located close to the battery cell 10 through the first inclination angle θ1. The first inclination angle θ1 may be a minimum angle throughout the entire length of the cell holder 20 to promote the thermal dissipation.

The first section L1 is relatively longer than the second and third sections L2 and L3. The first section L1 may have the longest length throughout the length of the cell holder 20 compared to the second and third sections L2 and L3. The first section $L_1$ may have a minimum angle, for example, the first inclination angle θ1, throughout the length of the cell holder 20. In other words, the first section L1 is the longest section and has a minimum inclination angle throughout the length of the cell holder 20. Accordingly, the first section L1 is configured to be close to the cell holder 20 with a minimum angle, such as the first inclination angle θ1, in the a maximum length of the first section such that heat of the battery cell 20 can be efficiently dissipated through the first section L1. The first section L1 is formed to be closest to the battery cell 20 compared to other sections such that a movement of the battery cell 10 is restricted in the front and rear direction. Accordingly, in one embodiment, the first section L1 is long enough in the front and rear direction to achieve the purpose of the restriction on the movement. For example, the first section L1 may be extended to have an inclination angle of 0.1° as the first inclination angle θ1 in the diagonal direction with respect to the center axis C.

The second section L2 is formed adjacent to the first section L1. The second section L2 may be a pair of sections formed or located at either side of the first section L1. The second section L2 has the second inclination angle θ2 greater than the first inclination angle θ1. For example, when the first inclination angle is 0.1°, the second inclination angle θ2 may be 0.3° (i.e., greater than the first inclination angle θ1 of 0.1°). Since the second inclination angle θ2 is greater than the first inclination angle θ1, a geometric tolerance with the core during the manufacturing process can be increased in a separation direction, for example, the front and rear direction.

The third section L3 may be formed adjacent to the second section L2. The third section L3 may be a pair of sections formed or located at either side of the second section L2 in positions away from the first section L1. The second section L3 has the second inclination angle θ3 greater than the second inclination angle θ2. For example, when the second inclination angle θ2 is 0.3°, the third inclination angle θ3 may be 0.5° (i.e., greater than the second inclination angle θ2 of 0.3°). Since the third inclination angle θ3 is greater than the second inclination angle θ2, a geometric tolerance with the core during the manufacturing process can be further increased in a separation direction, for example, the front and rear direction.

In summary, the first section L1 is formed as the bottle neck at the center portion of the cell holder 20, is extended as the longest section of the cell holder 20, and is extended in the diagonal direction to have the first inclination angle θ1 as a minimum inclination angle. The second section L2 may be a pair of sections located opposite end portions of the first section L1 in the front direction and the rear direction to have the second inclination angle θ2 greater than the first inclination angle θ1. The third section L3 may be a pair of sections located opposite end portions of the second section L2 in the front direction and the rear direction to have the third inclination angle θ3 greater than the second inclination angle θ2. As such, the first, second, and third sections L1, L2, and L3 are arranged from the center portion to the end portion of the cell holder 20 in the front and rear direction to have increased angles, for example, the corresponding first, second and third inclination angles θ1, θ2, and θ3 such that the geometric toleration with the core can be gradually increased along the front and rear direction in which the core is separated during the manufacturing process of the cell holder 20.

The lengths of the second section L2 and the third section L3 in the front and rear direction may be limited to minimum lengths for the purpose of increasing the geometric tolerance with the core during the manufacturing process. When the lengths of the second section L2 and the third section L3 are increased, the length of the first section L1 is decreased and the thermal dissipation of the cell holder 20 is affected by the increased lengths of the second section L2 and the third section L3.

Overall, the sidewall 20a of the cell holder 20 may be symmetrical with respect to the center portion of the cell holder in the front and rear direction. A process of assembling the cell holder 20 can be conveniently performed due to the symmetrical shape of the cell holder 20 regardless of an assembling direction.

Referring to FIG. 2, the protection circuit module 130 may be extended in the up and down direction different from the front and rear direction. The protection circuit module 130 is arranged in an upright position in the up and down direction. In other words, the protection circuit module 130 may be arranged, for example, not on a flat plane along the front and rear direction. This arrangement of the protection circuit module 130 may shorten a length of the secondary battery in the front and rear direction, and make the secondary battery compact.

The battery cell 10 and the protection circuit module 130 are located inside the first and second cases 110 and 120. The above described cases 110 and 120 may include cases configured to face each other to be assembled so that the battery cells 10 and the protection circuit module 130 are accommodated therein. The first and second cases 110 and 120 may include a cell receiver unit C1 to accommodate the battery cells 10 and a circuit receiver unit C2 to accommodate the protection circuit module 130. The battery cells 10 are arranged in the front and rear direction in the first row R1 and the second row R2, and the protection circuit module 130 is arranged in the upright position in the up and down direction. The cell receiver unit C1 and the circuit receiver unit C2 have different heights in the up and down direction, and the circuit receiver unit C2 may have a height higher than the cell receiver unit C1.

For example, the cell receiver unit C1 and the circuit receiver unit C2 to be located at an upper position may have different heights within the first case 110, and the cell receiver unit C1 and the circuit receiver unit C2 to be located at a lower position may be located in a same height within the second case 120. For example, the first case 110 is formed as a step-like shape according to a height deviation between the cell receiver unit C1 and the circuit receiver unit C2, and the second case 120 is formed as a flat shape such that the cell receiver unit C1 and the circuit receiver unit C2 can be located in substantially the same level.

Since the cell receiver unit C1 and the circuit receiver unit C2 are formed to have different heights, the circuit receiver unit C2 has a height deviation to protrude in the upper direction farther than the cell receiver unit C1. In the circuit receiver unit C2 protruding from the cell receiver unit C1 in the upper direction, an opening may be formed at a protruding portion at the height deviation to expose the external terminal 132. The external terminal 132 may be exposed outside to be connected to an external apparatus to form a charging and discharging path.

According to an embodiment of the present general inventive concept, a production yield may be improved and a defect ratio can be reduced by optimizing the structure of the cell holder.

According to an embodiment of the present general inventive concept, thermal dissipation of the battery cells is promoted, and a movement of the battery cells can be restricted.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A secondary battery comprising:
   a battery cell; and
   a cell holder accommodating the battery cell, the cell holder extending along a lengthwise axis, wherein a distance between opposing interior sidewalls of the cell holder varies continuously along the lengthwise axis between ends of the cell holder.

2. The secondary battery of claim 1, wherein the distance between opposing interior side walls is a minimum at a center portion of the cell holder and a maximum at an end portion of the cell holder.

3. The secondary battery of claim 1, wherein the distance between opposing interior side walls changes continuously in the first direction.

4. The secondary battery of claim 1, wherein:
   the interior sidewall is inclined with respect to a center axis of the opening.

5. The secondary battery of claim 4, wherein an inclination angle of the interior sidewall gradually increases with respect to a distance from a center portion of the sidewall toward an end portion of the sidewall.

6. The secondary battery of claim 4, wherein the cell holder comprises:
   a first section located at a center portion of the cell holder and having a first inclination angle;
   a second section located adjacent to the first section and having a second inclination angle greater than the first inclination angle; and
   a third section located adjacent to the second section and at end portions of the cell holder and having a third inclination angle greater than the second inclination angle.

7. The secondary battery of claim 6, wherein:
   the first section includes a bottle neck at the center portion of the cell holder with respect to the front and rear direction; and
   the first inclination angle is formed symmetrically at either side of the bottle neck.

8. The secondary battery of claim 6, wherein the first section is longer than the second section and the third section.

9. The secondary battery of claim 6, wherein the second section includes a pair of sections at either side of the first section in the front and rear direction.

10. The secondary battery of claim 6, wherein the third section includes a pair of sections at either side of the cell holder in the front and rear direction.

11. The secondary battery of claim 1, wherein the cell holder comprises a composite material including a matrix resin with a glass fiber.

12. The secondary battery of claim 1, wherein:
   the battery cell comprises a plurality of battery cells arranged in a first row and a second row extending in the first direction; and
   the cell holder includes a first cell holder accommodating the battery cells of the first row, and a second cell holder accommodating the battery cells of the second row.

13. The secondary battery of claim 12, wherein the first cell holder and the second cell holder are curved such that the battery cells of the first and second rows are arranged on an arc.

14. The secondary battery of claim 13, wherein the first cell holder and the second cell holder have a same curved shape.

15. The secondary battery of claim 12, wherein the first cell holder and the second cell holder are arranged such that the battery cells of the first row and the second row are not oriented in a straight line.

* * * * *